United States Patent

[11] 3,544,118

| [72] | Inventor | Donald E. Klein |
| | | Ellicott City, Md. |
| [21] | Appl. No. | 764,143 |
| [22] | Filed | Oct. 1, 1968 |
| [45] | Patented | Dec. 1, 1970 |
| [73] | Assignee | Koppers Company, Inc. |
| | | a corporation of Delaware |

[54] PRESSURE BALANCED SHAFT SEAL
14 Claims, 12 Drawing Figs.

[52] U.S. Cl. .................................................. 277/27,
277/75, 277/173; 92/162
[51] Int. Cl. ............................................. F16j 15/16,
F16j 15/40
[50] Field of Search ........................................ 277/3, 27,
74, 75, 173; 92/162, 183

[56] References Cited
UNITED STATES PATENTS

| 1,999,094 | 4/1935 | Godron | 277/27 |
| 2,175,868 | 10/1939 | Bentley | 277/3 |
| 2,563,971 | 8/1951 | Stein | 277/75 |
| 2,921,805 | 1/1960 | Shevchenko | 277/74X |
| 3,179,422 | 4/1965 | Phillips | 277/3 |
| 3,271,037 | 9/1966 | Hammond | 277/27 |
| 3,315,968 | 4/1967 | Hanlon | 277/3 |
| 3,334,906 | 8/1967 | Arnold | 277/3 |
| 3,348,849 | 10/1967 | Newcomb et al. | 277/27 |
| 3,377,073 | 4/1968 | Harney | 277/27 |
| 3,386,346 | 6/1968 | Halpin | 277/173X |

*Primary Examiner*—Samuel D. Rothberg
*Attorney*—Oscar B. Brumback, Boyce C. Dent and Olin E. Williams ABSTRACT: A shaft seal assembly for sealing against pulses of fluid pressure utilizing the principle of progressively reducing the pressure across adjacent seal rings by a unique combination of gas ports and expansion reservoirs to provide controlled leakage paths for establishing an instantaneous pressure differential throughout the duration of the pulses thereby reducing the wear of said seal rings.

INVENTOR.
DONALD E. KLEIN
BY Boyce C. Dent
Attorney

INVENTOR.
DONALD E. KLEIN
BY Boyce C. Dent
Attorney

INVENTOR.
DONALD E. KLEIN
BY Boyce C. Dent
Attorney

3,544,118

PRESSURE BALANCED SHAFT SEAL

BACKGROUND OF THE INVENTION

1. Field of the Invention

This invention relates generally to joint packing or sealing apparatus and more particularly to such apparatus having means for establishing pressure conditions within the assembly.

2. Description of the Prior Art

It is the usual practice to provide a seal assembly around a shaft or rod extending through a housing where the pulsating pressure differential from one side of the housing to the other is extremely high such as, for example, in reciprocating air compressors. Such seal assemblies usually include a number of seal rings within seal cups arranged serially along the reciprocating rod. One recurring problem has been that the first seal ring nearest the high pressure side of the housing is subjected to the greatest total force and therefore wears out more rapidly than the seal rings downstream. It has been recognized that if a way could be found to distribute the pressure among the several seal rings, they would tend to wear evenly thereby extending the working life of the complete seal assembly.

Several attempts have been made to accomplish pressure distribution among the seal rings but apparently with very limited success. For example, Carr et al. disclosed in U.S. Pat. No. 2,064,969 apparatus for applying progressively reduced pressures to the backside of the seal rings through adjustable valves arranged in parallel and also connecting the seal ring cavities with check valves to relieve the pressure during the return stroke of the rod. Bentley tried similar apparatus as disclosed in U.S. Pat. No. 2,175,868. Thereafter, Watson provided check valves connecting the seal ring cavities in a series as shown in U.S. Pat. No. 2,856,209. More recently, Arnold used a somewhat similar arrangement, as shown in U.S. Pat. No. 3,334,906. Some difficulty was encountered at high reciprocating speeds of the rod in that the check valves tended to chatter since they were required to open upon each pressure stroke of the rod.

A somewhat different approach was taken by Newcomb et al. in U.S. Pat. No. 3,348,849 by providing a plurality of rings with a "stepped clearance" between them and the rod during the absence of fluid pressure. Each ring is made of a different radial thickness, but with the same modulus of elasticity, so that the generation of fluid pressure tends to close the rings to nearly a zero clearance between them and the rod. Fluid pressure leaking past each seal is used to contract succeeding downstream rings against the rod. This construction requires extremely close tolerances and consistency of materials seldom obtainable.

Jepsen, in U.S. Pat. No. 3,373,999 generally follows the teachings of Newcomb et al. and strives to overcome the last-mentioned problem by providing a conventional seal ring operative from the beginning of the pressure stroke and another adjacent compressible ring which engages the cylinder wall only after the pressure exceeds a predetermined amount.

The most recent attempt at distributing the forces across a number of seal rings was made by Halpin as shown in U.S. Pat. No. 3,386,346. This effort represents a step in what is considered to be the right direction since the dimension of clearance C in this patent affects the pressure drop in successive downstream seal cavities. However, it is not evident what this clearance should be to achieve the pressure drop desired across the individual seal rings nor is provision made for utilizing the gas trapped under pressure in the seal cavities upon the return stroke of the piston. Since the pressure in the cylinder of a compressor is not instantaneously eliminated at the beginning of the return stroke of the piston, it is desirable to maintain a pressure differential during this latter period also.

Another important factor to be considered is that the pressure differential should be instantaneous, that is, a pressure differential should be maintained throughout the piston stroke of the compressor since the pressure pulse thus produced rises and falls along a pressure curve. A seal construction for establishing an instantaneous pressure differential does not seem to appear in the prior art.

It is evident from the foregoing that considerable improvement is needed to achieve optimum performance and reduced wear of a series of seals along a reciprocating rod such as used in a reciprocating compressor or, for that matter, in any type of apparatus that is subjected to pulsating fluid pressure such as, for example, a piston and cylinder assembly in an internal combustion engine.

SUMMARY OF THE INVENTION

Accordingly, an object of the present invention is to provide substantially instantaneous pressure distribution across a plurality of serially arranged seal rings throughout the duration of a pressure pulse to which the rings are subjected such that each ring bears its proportionate share of the whole load thereby distributing the wear rate among the rings.

These and other objects and novel features are accomplished by providing a seal ring assembly on a rod which is subject to pulsating pressure; the seal ring assembly comprising a series of axially spaced seal cups each having a cavity for retaining a seal ring in contact with a rod passing through the cup; each of the cups being connected by a gas passage of a size and shape to act as an expansion reservoir; each seal ring including gas ports connecting one side of the ring with the other; said expansion reservoirs and gas ports constructed in definite proportions to provide a leakage path with certain desired characteristics as hereinafter set forth. The characteristics of the leakage path are such that a finite pressure drop is achieved across each ring during most of the compression and return stroke of the rod.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
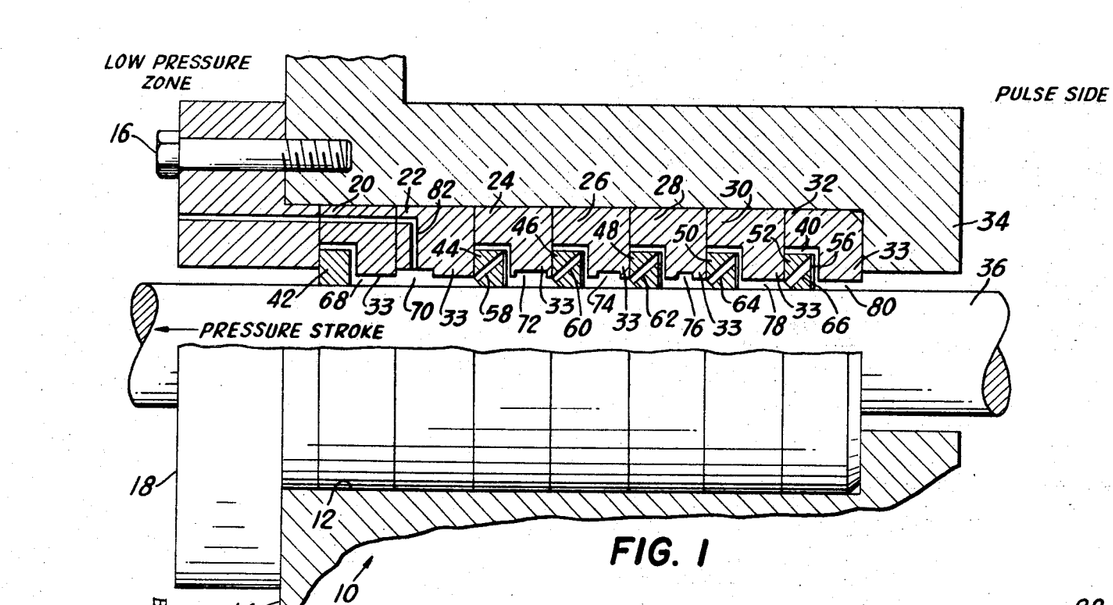
FIG. 1 is a side elevation in partial cross section of an embodiment of the seal assembly of the invention mounted in the wall of a compressor housing.

Referring now to FIG. 1, the seal assembly 10 of the present invention is shown mounted within a seal cavity 12 in the housing or wall member 14 defining the pressure chamber of a reciprocating compressor by bolts 16 passing through a flange 18 and into the housing. A number of seal cups 20,22,24,26,28,30 and 32 are mounted serially along the cavity 12 in gas-tight relation against an end wall 34 of housing 14 by the pressure of flange 18 against them. A reciprocating compressor rod or member 36 passes through a central opening in the cups from the high-pressure or pulse side of the housing to the low pressure side, the latter being usually at atmospheric pressure outside the housing to constitute a low-pressure zone at less pressure than the pressure of the pulse.

Figure 2:
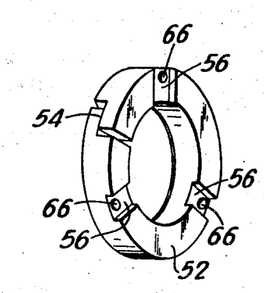
FIG. 2 is an isometric view of one of the seal rings used in the seal assembly of FIG. 1.

Each seal cup is provided with an annular recess 40 defined by annular wall portions 33 in which seal rings 42,44,46,48,50 and 52 are axially spaced along the rod 36 as shown there being no seal ring in cup 22 as will be later explained. Each seal ring is adapted to surround rod 36 in the conventional manner with the first ring 52 being exposed to the pressure pulse and the last ring 42 being exposed to the low-pressure zone. For example, as shown in FIG. 2, each seal ring is provided with a step joint 54 well known in the art, which permits the ring to be contractably placed around rod 36. It should be understood that other types of seal ring joints or other types of seal rings can be used so long as the principles of the present invention are applied to them. Pressure balancing grooves, not shown but well known in the art, may be formed in the inner periphery of the rings if desired. With the exception of ring 42, the low-pressure side of the seal rings is placed in fluid communication with gas passages 56 provided on the high-pressure or pulse side of the rings by the gas ports best illustrated in FIGS. 1 and 2. The gas ports as shown are of progressively smaller diameters in the rings progressing serially from the high-pressure side to the low-pressure side of the assembly. Accordingly, seal rings 44—52 include gas ports 58—66 respectively. These gas ports are inclined as shown so as not to interfere with balancing grooves (not shown) on the inner diameter of the seal rings. Otherwise, they may be formed parallel to the axis of rod 36 near the inner diameter of the seal rings. Ring 42 is plain, having no gas passages or gas ports, but having a step joint 54.

Seal cups 20—32 include central openings 68—80 respectively in annular wall portions 33 to provide for the passage of gas between the cups. These central openings are modified as shown in FIG. 1 to define expansion reservoirs 70—78 of progressively large diameters with rod 36 for succeedingly larger volumes of gas between the pairs of seal rings progressing serially downstream from the high pressure or pulse side of the assembly.

Figure 3:
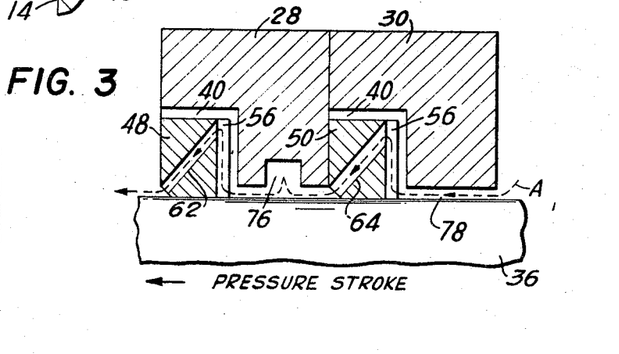
FIG. 3 is a cross-sectional view of two of the seal cups and seal rings of FIG. 1 illustrating the flow path of the gas during the pressure stroke of the rod.

The width of the seal rings is less than the width of the cavities 40 in the seal cups; the outer diameter of the seal rings is less than the outer diameter of cavities 40. Thus, it can be seen from this and the foregoing description that gas flow paths are provided for both the high pressure and return strokes of the rod 36. Flow path A is provided during the high-pressure stroke as best illustrated in FIG. 3. During the pressure stroke, rod 36 moves to the left. Gas pressure acting against the side faces of the seals move them against the side of the adjacent seal cup to the left. Thus, flow path A follows the dotted line through expansion reservoir 78, gas passage 56, and gas port 64 to corresponding reservoirs, passages, and ports in the downstream seals to thereby place the pulse of pressure in fluid communication with the low-pressure zone serially along the rod 36.

Upon the return stroke of the rod 36, the seals will move to the right if pressure on the high-pressure side falls below the pressure in the expansion reservoir, thus opening up flow path B as indicated by the dotted lines in FIG. 4. Flow path B follows flow path A except that the difference in width of the seals as compared to cavity 40 provides an additional path on the left side of the seal as clearly indicated. Since pressure on the high-pressure side of the assembly falls more rapidly on the return stroke than it builds up on the pressure stroke (this being a conventional characteristic of compressors), the additional volume of flow path B, caused by the seal rings moving to the right, permits pressure built up in the reservoirs to drop almost as rapidly as pressure on the high-pressure side of the assembly. Thus, the desired pressure differential is nearly maintained on the return stroke of rod 36. This is an important advantage since wear of the seals can also occur on the return stroke if the correct pressure differential is not maintained. To further control the differential pressure on the return stroke of the rod, the proportions of gas passages 56 can be modified in accordance with the calculations, hereinafter set forth, used to determine the proportions of the expansion reservoirs.

The effectiveness of the present invention depends on its ability to maintain a predetermined instantaneous pressure differential and a predetermined rate of change of pressure differential across each of the seal rings throughout the pressure pulse caused by the reciprocating cycle of the rod.

Figure 5:
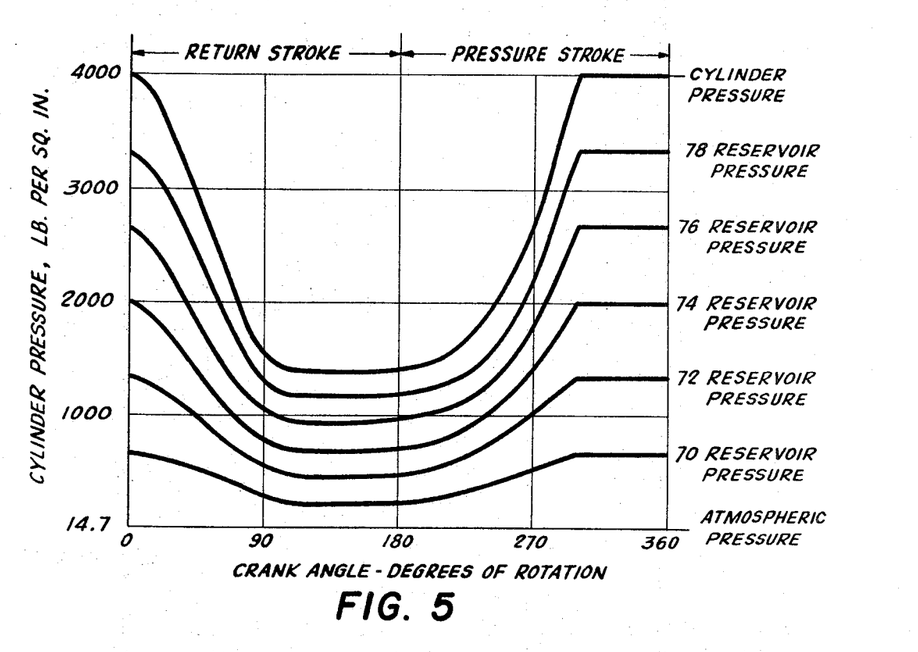
FIG. 5 is a graph representing the ideal pressure distribution across a plurality of seal rings.

For example, if the peak pressure in the compressor chamber on the high pressure side of the assembly is 3015 pounds per square inch (p.s.i.) with atmospheric pressure of 15 p.s.i. on the low-pressure side or zone, and it is desired that each seal ring be subjected to only 500 p.s.i. differential pressure, then six rings must be used to seal the total peak pressure. To subject each ring to 500 p.s.i. differential pressure, it is necessary to bypass each ring with all the pressure on its high-pressure side minus 500 p.s.i. to create a back pressure on the low-pressure side to counteract the frontal pressure. The problem, of course, is in bypassing each seal ring the proper amount since bypassing must coincide with the buildup of pulse pressure on the high-pressure side. FIG. 5 illustrates the theoretical curves desired. For example, the line designated "cylinder pressure" represents the pressure on the high pressure side of the first seal ring 52; line "78 reservoir pressure" represents the desired pressure of 500 p.s.i. less on the low-pressure side of the seal; line "74 reservoir pressure" represents the desired pressure of 500 p.s.i. less than the pressure of line "76 reservoir pressure" on the low-pressure side of the second seal ring 50. Note that the curves are drawn beginning at bottom dead center of the driving engine crank rod (conventional - not shown) and continue throughout the full return and pressure strokes of the rod so that the curve represents the complete pressure pulse.

As shown in FIG. 5, the curves representing differential reservoir pressure follow the cylinder pressure curve in increments of about 500 p.s.i. at the beginning of the return stroke. In actual practice, it has as yet proved impossible to cause the curves to follow one another exactly. However, by using the present invention, it is possible to achieve the curves shown in FIG. 6. Tests seem to indicate that the wear rate of the seals is related to the closeness at which the differential pressure curves follow the corresponding pressure curves shown in FIG. 5. Thus, the present invention represents the maximum efficiency presently obtainable.

In accordance with this invention, the desired pressure distribution is controlled by the gas ports illustrated herein as 58—66 and expansion reservoirs illustrated herein as 70—78. The ports and reservoirs do not act independently but must be proportioned relative to each other; the gas ports being used to control the velocity and amount of gas flowing into adjacent expansion reservoirs; and the reservoirs being used to control the expansion (that is, pressure drop) of the gas received from its associated gas port during a predetermined time interval. Thus, the gas pressure in the expansion reservoirs varies in controlled response to the pressure of the pulse throughout its duration beginning with the pressure stroke of the rod 36 and ending with the return stroke of the rod. Gas pressure in the reservoirs responds very quickly to the changing pulse pressure and so far as the effect on the seal assembly is concerned, the reservoir pressure responds instantaneously.

To determine the relative proportions of the gas ports and the expansion reservoirs, the instantaneous pressure on the high-pressure side must be known or calculated ("cylinder pressure", FIG. 5.) To plot this curve, the following must be known: cylinder diameter, rod diameter, clearance volume, crank stroke, crank length, compressibility of the gas, gas constant, and gas temperature. This information is usually readily available from the compressor manufacturer. Knowing these factors, the overall seal assembly construction (envelope size, seal size, etc.) can be determined in accordance with conventional seal practice.

Thereafter, the proportions of the gas ports and expansion reservoirs can be determined. However, it must be realized that no method presently exists for calculating the sizes of the ports and reservoirs merely from using the desired pressures. Instead, the sizes must first be assumed; from these assumptions, the actual instantaneous pressures can be determined. These pressures then indicate the changes in sizes necessary to obtain the pressures desired. By trial and error, values can be obtained which can be plotted to obtain curves that approach the desired theoretical curves shown in FIG. 5.

To begin the trial and error system, proportions of the gas ports and expansion reservoirs are assumed. Using these assumptions, formulaes (to be subsequently described) can be used to calculate the instantaneous pressure across any one seal. Should it appear from the curve plotted that too much gas is flowing into a reservoir, the gas port size can be reduced or conversely it can be increased in size to provide a greater amount of gas. Similarly, the size of the expansion reservoir can be increased or decreased to cause the volume of gas received from the gas port to expand the correct amount to provide the desired pressure drop.

Figure 6:
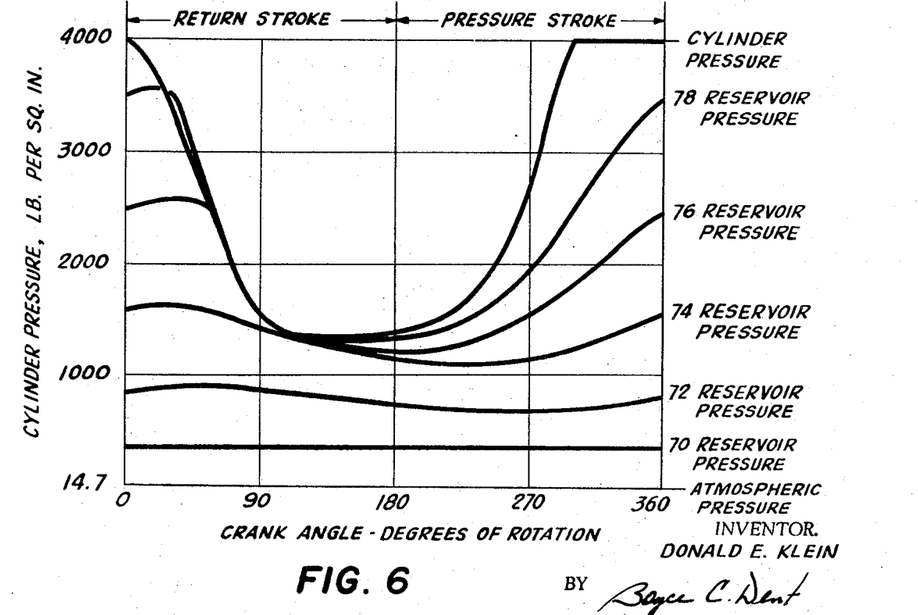
FIG. 6 is a graph representing the pressure differential obtainable from use of the present invention.
Figure 9:
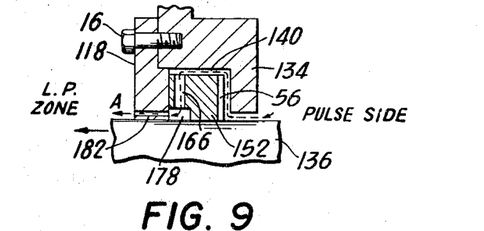
FIG. 9 is a cross-sectional view of a seal assembly utilizing a single seal ring.

It should be noted that each seal must be treated individually and in relation to the other seals. For example, as illustrated in FIG. 9, if only one seal is to be used to seal a peak pressure of 1000 p.s.i. with a pressure drop of 500 p.s.i., it would only be necessary to proportion the gas pott and reservoir so that the proper volume of gas passes through the port, into the reservoir where it would be expanded to achieve a 500 p.s.i. pressure drop. But, with multiple seals, the port and reservoir must be proportioned to permit an overflow of pressure at the proper velocity into the next reservoir through another gas port and so on in series down the line. To further complicate the matter, the desired pressure drop must follow the highest pressure curve ("cylinder pressure", FIG. 5) from its lowest to its highest value at an incrementally lower pressure. To do so becomes exceedingly difficult since the flow characteristics of the gas changes as its pressure changes. Accordingly, FIG. 6 represents the closest approximation to theoretical values presently attainable.

To determine the sizes of the gas ports and expansion reservoirs, it is necessary to first find the constant pressure in one reservoir, preferably reservoir 78 nearest the high-pressure side of the assembly, during an interval of time at an assumed constant applied pressure from the high-pressure side of the assembly, during an interval of time at an assumed constant applied pressure from the high pressure side of the assembly. Actually, this latter pressure is not constant since the compressor piston is moving; therefore, the time interval selected is quite small so that the difference in applied pressure has little or no effect on the result.

That is, theoretically the gas port and expansion reservoirs should be of different proportions for each point in time along the "78 reservoir pressure" curve of FIG. 5. Of course, it is physically impossible to vary these proportions as the pressure changes. Therefore, the differential pressures are calculated for each of several small time intervals along this curve and plotted along a curve, e.g. "78 reservoir pressure" FIG. 6. Thereafter, the proportions of the ports and reservoirs are changed until the curves follow one another as nearly as possible except at a selected lower level of pressure.

The constant pressure in the reservoir (of an assumed size) at the end of the time interval is a function of the amount of gas it contains at the beginning of the time interval plus the amount of gas flowing in from one gas port during the time interval less the amount of gas flowing out by another gas port during the same time interval.

Once the constant instantaneous pressure is found, the size of the reservoir can be changed to give the desired pressure in that reservoir. Thereafter, the same calculations can be used to determine the size of the next adjacent reservoir and so on down the line.

To determine the pressure in an expansion reservoir at any point in time, the amount of gas therein must be known and is preferably calculated in terms of unit weight. It should first be noted that the volume of the expansion reservoir includes all the volume between adjacent pairs of seals, e.g., the clearance of the seal cup around the rod, the clearance between the side of the seal ring and the seal cup, the clearance between the outer diameter of the seal ring and the seal cup, and the volume of the gas passages leading to the gas ports.

To determine the unit weight of the gas in an expansion reservoir, the following equation may be used:

$$UW = \frac{P}{12RT}$$

where:

$UW$ = the weight of gas in pounds per cubic inch
$P$ = the gas pressure in pounds per square inch
$R$ = the perfect gas constant. (Note—R varies with respect to the gas and is generally known to those skilled in the art. Most gas constants can be found in Marks Handbook, published by McGraw-Hill in New York, N.Y.). (e.g. the gas constant for air is 53.3)

and $T$ = the gas temperature in degrees Rankine

Knowing UW (the weight of gas in each cubic inch of volume) and knowing the volume (in cubic inches) of the expansion reservoir, the total weight of the gas in the reservoir is:

$$WT = UW \times V = \frac{P}{12RT} \times V$$

where:

$WT$ = total weight of gas in the reservoir in pounds and $V$ = volume of the reservoir in cubic inches In any time interval $\Delta t$, the amount (weight) of gas flowing into the expansion reservoir from the adjacent upstream gas port is:

$$W(in) = \frac{(KT)(KA)(P)(A)}{[T]^{1/2}}$$

where:

$W(in)$ = weight of the gas flowing into the reservoir
$KT$ = is the factor determining the rate of flow of gas through an orifice resulting from the ratio of pressure on opposite sides of the orifice. When the pressure $[P(x)]$ on the upstream side of the orifice divided by the pressure $[P(x+1)]$ on the downstream side is greater than 2, then $KT$ = a constant (e.g. air = .53). (Note: The $KT$ factor for various gases may be found in the aforementioned "Marks Handbook".) When $[P(x)] \div [P(x+1)]$ is equal to or less than 2, then:

$$KT = 2.06\left[\left(\frac{P(x+1)}{P(x)}\right)2/K - \left(\frac{P(x+1)}{P(x)}\right)\frac{K+1}{K}\right]^{1/2}$$

$K = \frac{C_p}{C_v}$ (e.g. 1.4 for air) where:

$C_p$ = specific heat of given gas at constant pressure
$C_v$ = specific heat of given gas at constant volume
(Note—the $K$ factor is well known in the art)

$K_A$ = flow coefficient—which is characterized for a given shape of leakage area. (The above noted "Marks Handbook" can be used to determine the $K_A$ factor for usual shapes of leakage areas. For unusual shapes, experimentation may be required.)

and $A$ = area of the leakage path (gas port) in square inches

The amount (weight) of gas flowing out of the expansion reservoir through the next downstream gas port can be found by using the same foregoing equation where W(in) would become W(out) (weight of gas flowing out).

Now, having found the weight of gas in the expansion reservoir at any point in time, and knowing how much gas is flowing in and out for any given time interval, the amount of gas in the reservoir at the end of time interval $\Delta t$ is the amount of gas in the reservoir plus the amount flowing in minus the amount flowing out which can be expressed as:

$$WT(\text{end of } \Delta t) = WT(\text{beginning of } \Delta t) + WT(\text{in}) - WT(\text{out})$$

Having found WT, the pressure (in pounds per square inch) in the reservoir can be found by multiplying each part of the last equation by $\frac{12RT}{V}$. Once this pressure is known, it can be compared to the theoretical value along the curves in FIG. 5 and the size of the gas ports can be changed to provide a greater or lesser pressure drop across the adjacent seal ring.

By solving the foregoing equations, the pressure in any one reservoir can be found at the end of a time interval $\Delta t$. These equations must be solved for all the reservoirs being used in the seal assembly and for each time interval $\Delta t$ throughout the time cycle of the compressor. Since the foregoing equations assume a constant value of pressure P and temperature T over a period of time $\Delta t$ when, in fact, they are constantly changing, a small error is incurred. This error can be reduced to a negligible value by choosing a very small value for $\Delta t$. It has been found that a time interval $\Delta t$ corresponding to the time that the crank in a compressor rotates 1½° is satisfactory.

The sizes of the gas ports and expansion reservoirs can be changed to give the desired pressure drop across any adjacent pair of seal rings; realizing of course, that a change in size of any one gas port or expansion reservoir will affect the pressure conditions of the adjoining gas ports and reservoirs. Accordingly, when the size of one port or reservoir is changed to obtain a different pressure drop, it will be necessary to recalculate the sizes needed for the other ports and reservoirs.

The foregoing calculations are based on the assumption that the gas is flowing in one direction, for example, from the high pressure side to the low pressure side of the assembly. However, it must be understood that the pressures can be such that other gas flow conditions can exist; for example (1) the gas can flow in one direction from the low pressure side of the assembly to the high pressure side; (2) the gas can flow in two directions relative to a particular expansion reservoir, for example, it can flow into the reservoir from both sides, or; (3) it can flow out of the reservoir from both sides. These conditions must be taken into account in solving the equations above.

Figure 8:
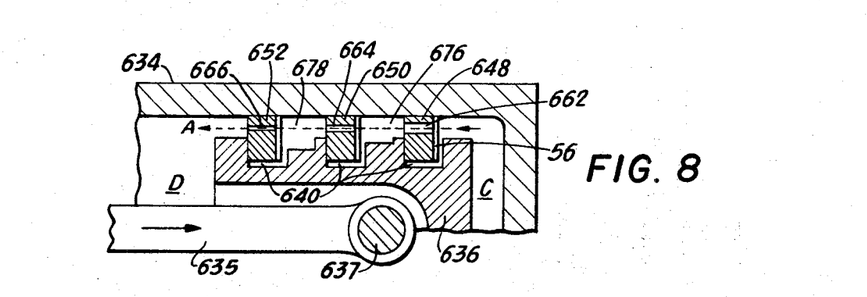
FIG. 8 is a cross-sectional view of a piston and cylinder utilizing the present invention.

These same calculations can be used to establish the desired pressure drop across a number of seals on the piston of a double-acting cylinder such as in an air compressor as illustrated in FIG. 8. In this case, the "cylinder pressure" curve (FIG. 5) exists alternately on both sides of the piston such that when discharge pressure of the compressor is on one side of the piston, suction pressure is on the other side. This condition must be taken into account when calculating the sizes of the gas ports and expansion reservoirs. In most instances, the suction pressure on one side of the piston will be much higher than the atmospheric pressure which exists on the low pressure side or zone of a rod seal such as shown in FIG. 1.

In operation, the seal is assembled as illustrated in FIG. 1. Assuming that the rod is just beginning to move to the left from its extreme right-hand position, it can be seen that seal ring 52 is subjected to the full pressure being built up through the opening 80 around rod 36; accordingly, the size of opening 80 is not critical since it does not function as an expansion reservoir. Gas will be blocked in cavity 40 around seal 52 because the seal is urged by gas pressure against the wall of seal cup 30; therefore, the gas passes through gas port 66 and into expansion reservoir 78. The size of reservoir 78 has been calculated (as previously explained) to hold the correct quantity of gas, and to be filled in the correct length of time as determined by the size of gas port 66, so that the pressure drop across seal 52 is 500 p.s.i. (or whatever value that has been designed for). Simultaneously, some of the gas filling expansion reservoir 78 is escaping through gas port 64 into reservoir 76; this reservoir has been calculated to have a larger volume than reservoir 78 so that the pressure drop across ring 50 is also 500 p.s.i. The flow of gas continues along path A as shown in FIG. 3 until it reaches the last reservoir 70. Reservoir 70 may be what would otherwise be cavity 40 in the other seal cups if its required volume is great enough that it cannot be formed as shown in adjacent cup 22; its size being calculated as hereinbefore described.

The last downstream seal 42 closes flow path A to atmosphere since it does not include a gas port; it also closes flow path B if it moves to the right upon the return stroke of the rod and there being no passage 56 provided to permit the flow of gas when it is on the right side of cavity 40. Thus, seal ring 42 makes reservoir 70 effective.

To dispose of the small volume of gas that has leaked past all the seal rings into reservoir 70 during the pressure stroke of rod 36, a restricted opening such as a gas vent 82 is provided to vent reservoir 70 to atmosphere or to a lower pressure reservoir (See FIG. 1). Vent 82, of course, is of a size to restrict the flow of gas out of reservoir 70 to make this reservoir effective. It is possible to make the clearance between ring 42 and rod 36 such that the clearance functions as the restricted opening or vent. However, it is much easier to provide the vent or port 82 as shown.

It is important to note that in order for the seal assembly to be effective, the gas filling the expansion reservoirs will be under the calculated pressure at the end of the pressure stroke of rod 36. This gas must be disposed of to place the reservoirs in condition for the next pressure stroke of the rod, that is, they must be near the same pressure as the low pressure side of the rod, usually atmospheric. Accordingly, the reason for passages 56 now becomes obvious. Upon the return stroke of rod 36, the seal rings move to the right-hand side of cavities 40; the gas held in the expansion reservoirs and cavities 40 bleeds through passages 56 along path B (see FIG. 4) and toward the pressure side of the assembly thereby placing all of the reservoirs in condition for the next pressure stroke of the rod. The sizes of gas passages 56 can also be determined from the foregoing equations so that they control the pressure response during the return stroke of the rod. Thus, an instantaneous controlled pressure response is obtained during this return stroke.

ALTERNATE EMBODIMENTS

As previously mentioned, under certain pressure conditions, a single seal ring may be sufficient to achieve the desired pressure differential such as illustrated in FIG. 9. In this construction, a cavity 140 is provided in the wall 134 defining a compressor chamber (not shown) in which a seal ring 152 is retained by a flange 118. An expansion reservoir 178 is formed in the inner periphery of ring 152 adjacent rod 136 of a size determined in accordance with the formulas previously referred to. A gas port 166 extends radially from reservoir 178 through the ring 152 thereby placing the reservoir in fluid communication with the pulse side of the assembly. Flange 118 has a restricted opening or vent 182 therein placing reservoir 178 in communication with the low-pressure zone. Flow path A shows the path of travel of the gas during the pressure stroke of rod 136 moving to the left as indicated by the arrow. Upon the return stroke of the rod, the gas will follow a path similar to that illustrated in FIG. 4.

Figure 10:
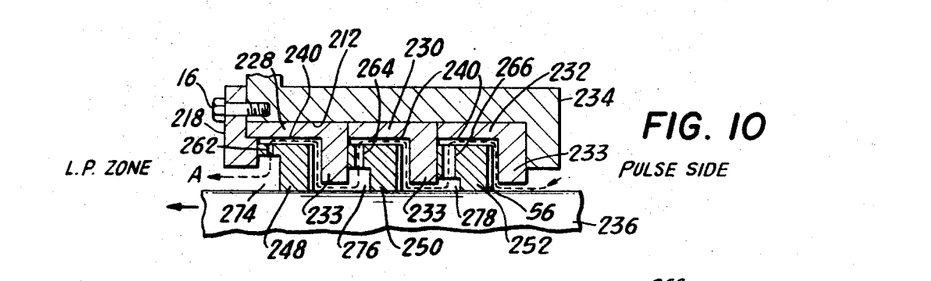
FIG. 10 is a cross-sectional view of a seal assembly utilizing a plurality of the seal ring of FIG. 9.

FIG. 10 illustrates the use of a plurality of seal rings 248, 250, and 252 similar to ring 152 of FIG. 9. In this construction, a cavity 212 is provided in wall 234 in which a seal cups 228, 230, and 232 are serially retained by flange 218. The cups include a cavity 240 defined by annular wall portions 233 which axially space the rings 248, 250, and 252 along rod 236. Expansion reservoirs 274, 276, and 278 are formed in rings 248, 250, and 252 respectively and are of a size calculated as previously described except that, in this construction, reservoir 274 does not function as such since it is in the low-pressure zone. Gas ports 262, 264, and 266 extend radially through the rings from the reservoirs thereby placing the reservoirs in serial fluid communication with the pulse side of the assembly. The last downstream port 262 in ring 248 functions as the restricted opening or vent to the low-pressure zone to control the pressure in reservoir 276. During the pressure stroke of the rod, as indicated by the arrow, the gas will follow flow path A as shown. Flow path B (not shown) will be similar to that shown in FIG. 4.

Since the seal rings may sometimes be made of a relatively soft material, such as carbon, the high velocity of the gas flowing through the gas ports may tend to erode the parts thereby reducing their effectiveness. To overcome this problem, the construction of FIG. 11 may be used. This construction is similar in all respects to the construction of FIG. 10 (and the same numbers have been applied to identical parts) except that the seal rings are divided into rings 348, 350, and 352 and auxiliary rings 349, 351, and 353. Rings 348, 350, and 352 are made of the material desired for sealing against rod 236 and auxiliary rings 349, 351, and 353 are made of a hard material which will not easily erode from high velocity gas. A shoulder 355 is provided on the auxiliary rings for centering them within the cavities 240.

Figure 11:
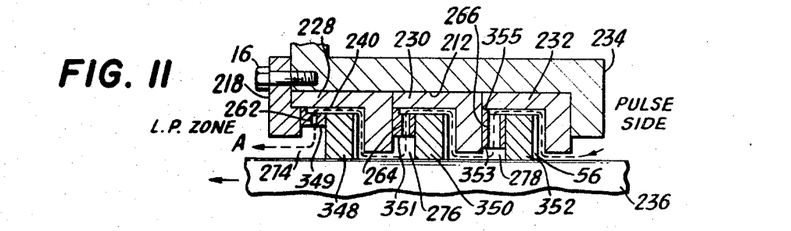
FIG. 11 is a cross-sectional view of a seal assembly utilizing auxiliary rings with the seal rings.
Figure 12:
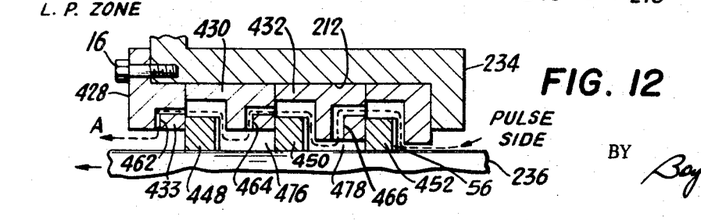
FIG. 12 is a cross-sectional view of still another embodiment of the invention.

Alternatively, instead of providing the the auxiliary rings of FIG. 11, gas ports 462, 464, and 466 may be formed in the seal cups 428, 430 and 432 as shown in FIG. 12. Rings 448, 450, and 452 would then correspond to rings 348, 350, and 352 of FIG. 11. Expansion reservoirs 476 and 478 are formed in annular walls 433 similar to the ones shown in FIG. 1.

Figure 4:
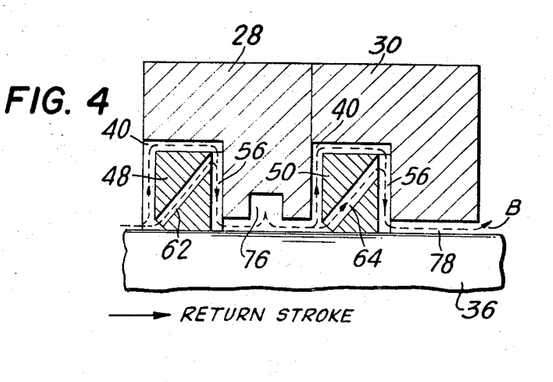
FIG. 4 is a cross-sectional view of the two seal cups and seal rings of FIG. 3 illustrating the flow path of the gas during the return stroke of the rod.
Figure 7:
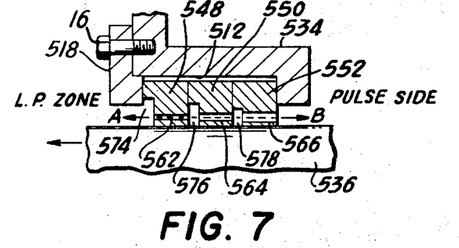
FIG. 7 is a cross-sectional view of another embodiment of the invention utilizing seal rings without the use of seal cups.

In some instances it may be that the pressure pulse is relieved at the end of the pressure stroke of the rod, such that there would be no advantage in providing additional volume in flow path B as illustrated in FIG. 4. Under such conditions, the construction of FIG. 7 can be used. As illustrated therein, seal rings 548, 550, and 552 are serially mounted along rod 536 in direct contact with each other in cavity 512 of wall 534 and retained therein by flange 518. Expansion reservoirs 574, 576, and 578 are formed in the inner periphery of rings 548, 550, and 552 with reservoir 574 being inactive as a reservoir. Gas Ports 564 and 566 place the reservoirs in serial fluid communication axially along rod 536 while gas port 562 places reservoir 576 in communication with the low-pressure zone. Thus, flow path A and flow path B are one and the same.

FIG. 8 schematically illustrates a portion of a piston and cylinder arrangement which can be viewed as either a double-acting piston in a compressor or a piston in an internal combustion engine. The previously described principles of the present invention are equally applicable to both arrangements. When viewed as a double-acting piston, a pressure pulse, as previously described, will build up and decline alternately in chambers C and D; when viewed as an internal combustion engine, the pulse will build up in chamber C from ignition of the fuel and chamber D will be a zone of lower pressure as previously described. Either way, the seal rings, expansion reservoirs, and gas ports function similarly to that previously described for FIG. 1.

In the construction shown in FIG. 8, a piston 636 is reciprocated within cylinder wall 634 by a crank rod 635 secured to the piston 636 by a pin 637 in the conventional manner. Grooves 640 are provided in piston 636 in which seal rings 648, 650, and 652 are mounted. These rings are similar to the one shown in FIG. 2 except that inherent spring tension urges them into sealing engagement with the cylinder wall 634 rather than having them contract against a rod such as in FIG. 1. Expansion reservoir 676 and 678 are formed in the piston 636 itself of a size determined as previously described. If desired, seal cups (not shown) can be provided to surround the piston to form grooves 640. The seal rings are provided with gas ports 662, 664, and 666 respectively and extend axially through the rings. In operation, flow path A and flow path B (not shown) will be very similar to those shown in FIG. 1.

When the foregoing construction is used in a double-acting compressor, flow path B may not adequately control the pressure in the expansion reservoirs on the return stroke of the piston. In this event, a second set of rings (not shown) arranged as a mirror-image of the set shown can be provided on the left-hand side of the piston; in conjunction with this arrangement, gas passages 56 would be made large enough to have no effect (that is, the pulse pressure would be exerted on both sides of the rings) so that the reverse flow path A (not shown) in the second set of rings would become effective on the return stroke of the piston to establish the desired pressures in the expansion reservoirs.

In summary, the present invention provides means for accurately controlling the instantaneous pressure of gas on the sides of the seals in response to the pressure of a gas pulse throughout the duration of the pulse thereby extending the working life of the seals. The invention can be modified to function in many types of machines subject to pulsating pressures; the seals may be in sealing engagement with a cylinder wall or a rod which reciprocates, rotates, or does neither or both.

The invention having been described in its best embodiment and mode of operation, that which is desired to be claimed by Letters Patent is:

I claim:

1. In apparatus for sealing against the passage of a pulse of gas pressure between a first member and a second member surrounding said first member and defining a cavity therewith, the improvement comprising:
    a plurality of seal rings mounted serially in contact with said first member within radially spaced walls of said cavity, said rings each having one side exposed to said pulse and a second side opposite said one side; and
    means for establishing an instantaneously variable gas pressure on said second side of the rings which varies in controlled response to the pressure of said pulse during the duration thereof and for establishing an instantaneously variable gas pressure on said one side of the rings which varies in controlled response to said gas pressure established on said second side of the rings following the duration of said pulse, said means for establishing an instantaneously variable gas pressure on said second side of the rings including:
    an expansion reservoir on said second side of each of said rings in fluid communication with said pulse, said reservoir communicating with a restricted opening in each of said seal rings to limit the escape of gas therefrom to control the pressure of gas in said reservoir in response to the pressure of said pulse and to limit the entrance of gas therein to control the pressure of gas in said reservoir in response to said gas pressure established on said second side of the rings following duration of said pulse.

2. The apparatus of claim 1 wherein said reservoir is formed in the periphery of said cavity.

3. The apparatus of claim 1 wherein said reservoir is formed in the inner periphery of said ring adjacent said first member 4. The apparatus of claim 1 wherein fluid communication between said reservoir and said pulse is established by a gas port in said ring extending from said one side to said second side of said ring.

5. The apparatus of claim 1 wherein fluid communication between said reservoir and said pulse is established by a gas port in said second member extending from said one side of said ring to said reservoir.

6. The apparatus of claim 1 wherein said restricted opening comprises a vent connecting said reservoir to a zone of gas pressure lower than the gas pressure in said reservoir.

7. The apparatus of claim 6 wherein said vent is formed in said second member.

8. In apparatus for sealing against the passage of a pulse of gas pressure from within a chamber and along a rod extending through a cavity in a wall defining said chamber, the improvement comprising:
   a first seal ring mounted within said cavity and in contact with said rod, said seal ring having one side exposed to said pulse and a second side opposite said one side;
   a second seal ring mounted within said cavity and spaced from said second side along said rod;
   an expansion reservoir between said first and second rings defined by said wall and said rod;
   said first ring including a gas port connecting said reservoir with said pulse for controlling the velocity and volume of gas flowing into said reservoir to establish gas pressure therein; and
   a vent connecting said reservoir to a zone of gas pressure lower than the gas pressure in said reservoir to control the escape of a gas therefrom
      for establishing an instantaneously variable gas pressure in said reservoir which varies in controlled response to the pressure of said pulse during the duration thereof; and
      for establishing an instantaneously variable gas pressure in said reservoir which varies in controlled response to said gas pressure established in said reservoir following the duration of said pulse.

9. In apparatus for sealing against the passage of a pulse of gas pressure from within a chamber and along a rod extending through a cavity in a wall defining said chamber, the improvement comprising:
   a plurality of seal rings mounted serially in contact with said rod and within radially spaced walls of said cavity, the first of said rings exposed to said pulse and the last of said rings exposed to a zone of gas pressure lower than the pressure of said pulse;
   an expansion reservoir between adjacent ones of said rings; and
   a plurality of gas ports connecting said reservoirs in serial fluid communication with said pulse and said zone of gas pressure for controlling both the velocity and volume of gas flowing into and out of said reservoirs during the duration of said pulse to establish a gas pressure therein and following the duration of said pulse to relieve the gas pressure established therein, whereby the gas pressure in said reservoirs varies in controlled response to the pressure of said pulse and to the absence of said pulse.

10. The apparatus of claim 9 wherein:
   each of said expansion reservoirs is progressively larger than the next serially adjacent reservoir nearer the pulse of said apparatus; and
   each of said gas ports is progressively smaller than the next serially adjacent gas port nearer the pulse side of said apparatus.

11. The apparatus of claim 10 wherein said expansion reservoirs and said gas ports are proportioned to produce a pressure differential across one of said seal rings substantially identical to one of the pressure curves illustrated in FIG. 6 throughout the duration of said pulse.

12. The apparatus of claim 9 further including:
   a plurality of seal cups mounted serially along said rod and within said cavity, said cups having an annular wall portion separating said seal rings and forming an annular recess for receiving a seal ring therein;
   said expansion reservoirs defined by the sidewalls of adjacent seal rings and by said annular wall portions and said rod; and
   said gas ports being formed in said seal rings.

13. The apparatus of claim 12 wherein said expansion reservoirs are formed in the periphery of said seal rings and around said rod and having one side thereof defined by an annular wall portion of said seal cups, said gas ports extending radially from said reservoirs through said rings.

14. In apparatus for sealing against the passage of a pulse of gas pressure between a piston reciprocating within a cylinder and the inner wall of said cylinder, the improvement comprising:
   said piston including a plurality of annular grooves spaced axially along the periphery of said piston;
   a plurality of seal rings in said grooves in sealing engagement with said inner wall, the first of said rings having a side exposed to said pulse and the last of said rings having a side exposed to a zone of gas pressure lower than the pressure of said pulse; and
   a plurality of expansion reservoirs between said seal rings in serial fluid communication with said pulse and said zone of lower pressure for establishing an instantaneously variable gas pressure in each of said reservoirs which varies in controlled response to the pressure of said pulse during the duration thereof and for establishing an instantaneously variable gas pressure in each of said reservoirs which varies in controlled response to said gas pressure established in said reservoirs following the duration of said pulse.

PO-1050
(5/69)

UNITED STATES PATENT OFFICE
CERTIFICATE OF CORRECTION

Patent No. 3544118      Dated December 1, 1970

Inventor(s) Donald E. Klein

It is certified that error appears in the above-identified patent and that said Letters Patent are hereby corrected as shown below:

In Claim 13, line 31

"defined by an annular"

should read

--defined by an adjacent annular--

SIGNED AND SEALED
MAR 2 1971

(SEAL)
Attest:

Edward M. Fletcher, Jr.
Attesting Officer

WILLIAM E. SCHUYLER, JR
Commissioner of Patents